United States Patent
Kaczmarska-Wojtania et al.

(10) Patent No.: US 9,565,553 B2
(45) Date of Patent: *Feb. 7, 2017

(54) LOCALIZING A MOBILE DATA PATH IN A RADIO ACCESS NETWORK UNDER CONTROL OF A MOBILE PACKET CORE IN A NETWORK ENVIRONMENT

(71) Applicant: CISCO TECHNOLOGY, INC., San Jose, CA (US)

(72) Inventors: Malgorzata Kaczmarska-Wojtania, Plano, TX (US); Andrew S. Gibbs, Andover, MA (US); Martin Schubert, Schutterwald (DE); Gibson Soon Teck Ang, Westford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,133

(22) Filed: Jan. 6, 2016

(65) Prior Publication Data
US 2016/0119777 A1    Apr. 28, 2016

Related U.S. Application Data

(63) Continuation of application No. 14/086,754, filed on Nov. 21, 2013, now Pat. No. 9,253,810.

(51) Int. Cl.
*H04W 4/00* (2009.01)
*H04W 76/02* (2009.01)
*H04W 28/12* (2009.01)
*H04W 8/20* (2009.01)

(52) U.S. Cl.
CPC ............. *H04W 8/205* (2013.01); *H04W 28/12* (2013.01); *H04W 76/022* (2013.01)

(58) Field of Classification Search
None
See application file for complete search history.

(56) References Cited

U.S. PATENT DOCUMENTS

| 7,953,820 B2 | 5/2011 | Stevens |
| 8,693,233 B2 | 4/2014 | Scheuerlein et al. |
| 9,253,810 B2 | 2/2016 | Kaczmarska-Wojtania et al. |

(Continued)

FOREIGN PATENT DOCUMENTS

EP    2876914    5/2015

OTHER PUBLICATIONS

U.S. Appl. No. 15/082,218, filed Mar. 28, 2016, entitled "Providing In-Line Services Through Radio Access Network Resources Under Control of a Mobile Packet Core in a Network Environment," Inventors: Malgorzata Kaczmarska-Wojtania, et al.

(Continued)

*Primary Examiner* — Chi H Pham
*Assistant Examiner* — Soon-Dong D Hyun
(74) *Attorney, Agent, or Firm* — Patent Capital Group (57) ABSTRACT

A method is provided in one example embodiment and includes establishing a control channel between a first entity associated with an access network and a second entity associated with a core network. The control channel is associated with a session identifier identifying a user session. The method further includes receiving policy information associated with the user session from the second entity using the first control channel. The policy information is indicative of one or more policies to be applied in the access network to user data associated with the user session.

30 Claims, 6 Drawing Sheets

(56) References Cited

U.S. PATENT DOCUMENTS

| | | |
|---|---|---|
| 9,300,453 B2 | 3/2016 | Kaczmarska-Wojtania et al. |
| 9,392,025 B2 | 7/2016 | Bosch et al. |
| 2002/0187777 A1 | 12/2002 | Osterhout |
| 2003/0076815 A1 | 4/2003 | Miller et al. |
| 2004/0133683 A1 | 7/2004 | Keller et al. |
| 2007/0162599 A1 | 7/2007 | Nguyen |
| 2008/0305784 A1 | 12/2008 | Dillinger et al. |
| 2009/0116477 A1 | 5/2009 | Belling et al. |
| 2010/0098096 A1 | 4/2010 | Yang |
| 2010/0106845 A1 | 4/2010 | Hu et al. |
| 2010/0153561 A1 | 6/2010 | Capone et al. |
| 2011/0028120 A1 | 2/2011 | Wu |
| 2011/0051683 A1 | 3/2011 | Ramankutty et al. |
| 2011/0070906 A1 | 3/2011 | Chami et al. |
| 2011/0310731 A1 | 12/2011 | Park et al. |
| 2012/0082093 A1 | 4/2012 | Andreasen et al. |
| 2012/0082094 A1 | 4/2012 | Andreasen et al. |
| 2012/0082132 A1 | 4/2012 | Andreasen et al. |
| 2012/0084388 A1 | 4/2012 | De Foy et al. |
| 2012/0102174 A1 | 4/2012 | Zhou et al. |
| 2012/0173661 A1 | 7/2012 | Mahaffey et al. |
| 2012/0209942 A1 | 8/2012 | Zehavi et al. |
| 2013/0007286 A1 | 1/2013 | Mehta et al. |
| 2013/0016677 A1 | 1/2013 | Kunz et al. |
| 2013/0018978 A1 | 1/2013 | Crowe et al. |
| 2013/0097309 A1 | 4/2013 | Ma et al. |
| 2013/0173756 A1 | 7/2013 | Luna et al. |
| 2014/0051437 A1 | 2/2014 | Diachina et al. |
| 2014/0064177 A1 | 3/2014 | Anchan |
| 2014/0064249 A1 | 3/2014 | Lee et al. |
| 2014/0233384 A1 | 8/2014 | Howard |
| 2014/0241158 A1 | 8/2014 | Anthony et al. |
| 2014/0378105 A1 | 12/2014 | Suryavanshi |
| 2015/0139041 A1 | 5/2015 | Bosch et al. |
| 2015/0139075 A1 | 5/2015 | Bosch et al. |
| 2015/0139084 A1 | 5/2015 | Kaczmarska-Wojtania et al. |
| 2015/0139085 A1 | 5/2015 | Kaczmarska-Wojtania et al. |
| 2016/0277168 A1 | 9/2016 | Kaczmarska-Wojtania et al. |

OTHER PUBLICATIONS

USPTO Aug. 11, 2016 Non-Final Office Action from U.S. Appl. No. 15/082,218.

USPTO Jun. 29, 2015 Non-Final Office Action from U.S. Appl. No. 14/086,734.

USPTO Jan. 13, 2016 Non-Final Office Action from U.S. Appl. No. 14/086,734.

"AAA protocol," Wikipedia, the free encyclopedia, Feb. 13, 2014, 4 pages http://en.wikipedia.org/w/index.php?title=AAA_protocol&oldid=595247372.

"GPRS core network," Wikipedia, the free encyclopedia, Mar. 15, 2014, 10 pages, http://en.wikipedia.org/w/index.php?title=GPRS_core_network&oldid=599684316.

"GPRS Tunnelling Protocol," Wikipedia, the free encyclopedia, Feb. 13, 2014, 11 pages, http://en.wikipedia.org/w/index.php?title=GPRS_Tunnelling_Protocol&oldid=595292488.

"Lawful Interception," Wikipedia, the free encyclopedia, Dec. 24, 2013, 11 pages http://en.wikipedia.org/w/index.php?title=Lawful_interception&oldid=587527305.

"Proxy Server," Wikipedia, the free encyclopedia, Mar. 17, 2014, 21 pages http://en.wikipedia.org/w/index.php?title=Proxy_server&oldid=600031885.

GPP-TS-29.281-V9.2.0 (Mar. 2010), 3rd Generation Partnership Project; Technical Specification Group Core Network and Terminals; General Packet Radio System (GPRS) Tunnelling Protocol User Plane (GTPv1-U) (Release 9), 3GPP Organizational Partners, Mar. 2010, 24 pages.

EPO Jun. 3, 2015 Extended Search Report and Written Opinion from European Application Serial No. 14194359.

LOCALIZING A MOBILE DATA PATH IN A RADIO ACCESS NETWORK UNDER CONTROL OF A MOBILE PACKET CORE IN A NETWORK ENVIRONMENT

RELATED APPLICATION

This Application is a continuation (and claims the benefit of priority under 35 U.S.C. §120) of U.S. application Ser. No. 14/086,754, filed Nov. 21, 2013, entitled "LOCALIZING A MOBILE DATA PATH IN A RADIO ACCESS NETWORK UNDER CONTROL OF A MOBILE PACKET CORE IN A NETWORK ENVIRONMENT," Inventors Malgorzata Kaczmarska-Wojtania, et al. The disclosure of the prior application is considered part of (and is incorporated in its entirety by reference in) the disclosure of this application.

TECHNICAL FIELD

This disclosure relates in general to the field of communications and, more particularly, to localizing a mobile data path in a radio access network under control of a mobile packet core in a network environment.

BACKGROUND

Today, a mobile user's data session is anchored on a mobile gateway such as a (GGSN, PGW) working as part of a mobile packet core. Anchoring the mobile data session on the mobile gateway includes anchoring both control and data traffic flows between the user's device and the mobile gateway. Control traffic is exchanged between the user's device and the gateway, and then terminated on the gateway. In an uplink direction, the data traffic is decapsulated from a mobile encapsulation protocol and presented on a Gi interface as Internet Protocol (IP) packets. The data traffic is then often sent either to a service provider private network to deliver services or service provider private content, or is sent to the Internet for content delivery. The mobile gateway terminates tunnel encapsulation specific to the mobile network and presents IP traffic on its Internet facing interface. The mobile gateway is also responsible to applying various services to the data stream based on a user profile. Examples of such services include quality of service (QoS), deep packet inspection, traffic management, lawful intercept, http header enrichment as well as billing the data stream sent to and/or from the user. These services are applied in the mobile packet core, and mobile operators typically have a complete infrastructure to provide these services to the mobile user based on his or her profile. All of the data traffic between the user equipment and its termination point in both the uplink and downlink directions passes via the mobile gateway.

In selected scenarios it is desirable to it terminate the mobile data path locally in the radio access network (RAN) or the transport. This is called the local termination point. A goal of the local data path termination is the need to serve local content or to apply localized services which in turn leads to greater network efficiency and better user experience. However the local termination needs to be very selective and it should be based on the user profile and other criteria only known to the core network. The set of criteria whether to terminate the data plane locally will depend on the user's subscription services, his service plan, billing status and other factors that are only known in the packet core. Therefore the decision to locally terminate the data path cannot be made at the potential local termination point because the local termination point is unable to make unilateral decision linked to the user's profile.

Furthermore, for the locally serviced traffic it is essential that the mobile packet core functions such as billing are still applied to the locally terminated traffic. Typical 3GPP network mechanism do not allow for this selective data path handling while still supporting mobile packet core services. The localized data path handling is required in the environments where there are suitable resources in the RAN to allow to localized content and service delivery. It remains a challenge to implement a solution to the problem in a practical and efficient manner so that the existing mobile packet core deployments are not disrupted.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a control channel between a first entity associated with an access network and a second entity associated with a core network. The control channel is associated with a session identifier identifying a user session. The method further includes receiving policy information associated with the user session from the second entity using the first control channel. The policy information is indicative of one or more policies to be applied in the access network to user data associated with the user session.

In a particular embodiment, the method further includes implementing the one or more policies indicated by the policy information for user data associated with the user session. In still another particular embodiment, implementing the one or more policies includes executing an application within the access network to process the user data in accordance with the one or more policies.

In a particular embodiment, the first control channel uses a tunneling protocol between the first entity and the second entity. In still another particular embodiment, the control channel is an out-of-band channel between the first entity and the second entity.

In another particular embodiment, the first entity is a client entity and the second entity is a director entity. In another particular embodiment, the user session is associated with a user equipment. In still another particular embodiment, the first entity resides within a base station. In still another particular embodiment, the second entity resides within a packet gateway.

One or more non-transitory tangible media are provided in an example embodiment that includes code for execution and when executed by a processor operable to perform operations including establishing a control channel between a first entity associated with an access network and a second entity associated with a core network. The control channel is associated with a session identifier identifying a user session. The operations further include receiving policy information associated with the user session from the second entity using the first control channel, the policy information indicative of one or more policies to be applied in the access network to user data associated with the user session.

An apparatus is provided in another example embodiment and includes a memory element configured to store data, a processor operable to execute instructions associated with the data, and at least one module. The at least one module is configured to establish a control channel between a first entity associated with an access network and a second entity associated with a core network. The control channel is associated with a session identifier identifying a user session. The at least one module is further configured to receive policy information associated with the user session from the second entity using the first control channel. The policy information is indicative of one or more policies to be applied in the access network to user data associated with the user session.

A method is provided in another example embodiment and includes establishing a control channel between a first entity associated with an access network and a second entity associated with a core network. The control channel is associated with a session identifier identifying a user session. The method further includes generating policy information associated with the user session. The policy information is indicative of one or more policies to be applied in the access network to user data associated with the user session. The method further includes sending the policy information to the second entity using the control channel.

In more particular embodiments, the method further includes storing the policy information as a first state of the second entity. In a particular embodiment, applying the one or more policies includes executing an application within the access network to process the user data in accordance with the one or more policies.

In another particular embodiment, the control channel uses a tunneling protocol between the first entity and the second entity. In still another embodiment, the control channel is an out-of-band channel between the first entity and the second entity.

In another particular embodiment, the first entity is a client entity and the second entity is a director entity. In still another particular embodiment, the user session is associated with a user equipment. In still another particular embodiment, the first entity resides within a packet gateway. In still another particular embodiment, the second entity resides within a base station.

One or more non-transitory tangible media are provided in another embodiment that includes code for execution and when executed by a processor operable to perform operations. The operations include establishing a control channel between a first entity associated with an access network and a second entity associated with a core network. The control channel associated with a session identifier identifying a user session. The operations further include generating policy information associated with the user session. The policy information is indicative of one or more policies to be applied in the access network to user data associated with the user session. The operations further include sending the policy information to the second entity using the control channel.

An apparatus is provided in another example embodiment that includes a memory element configured to store data, a processor operable to execute instructions associated with the data, and at least one module. The at least one module is configured to establish a control channel between a first entity associated with an access network and a second entity associated with a core network. The control channel is associated with a session identifier identifying a user session. The at least one module is further configured to generate policy information associated with the user session. The policy information is indicative of one or more policies to be applied in the access network to user data associated with the user session. The at least one module is further configured to send the policy information to the second entity using the control channel.

EXAMPLE EMBODIMENTS

Figure 1:
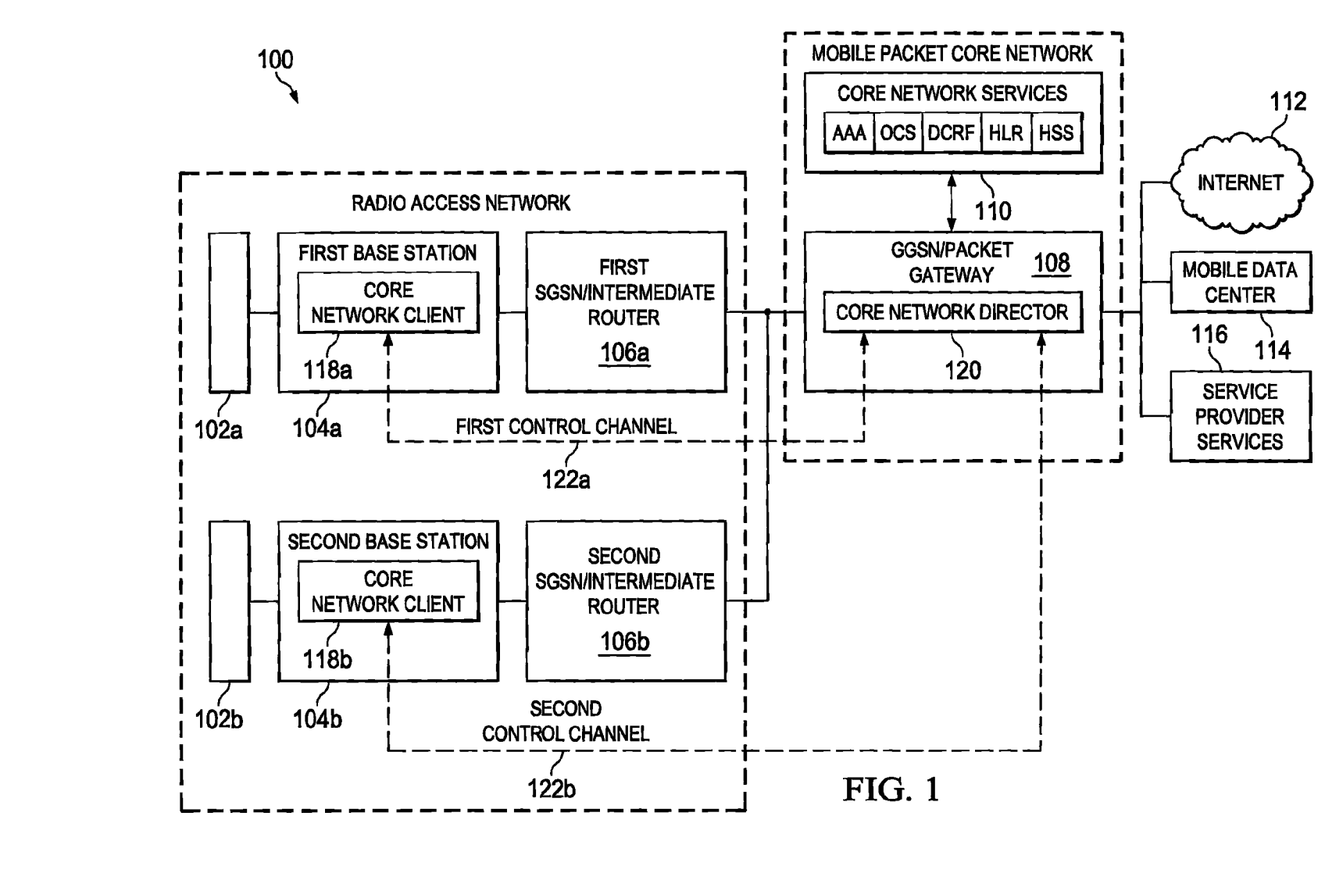
FIG. 1 is a simplified block diagram of an example embodiment of a communication system for localizing a mobile data path in a radio access network under control of a mobile packet core in a network environment.

Turning to FIG. 1, FIG. 1 is a simplified block diagram of an example embodiment of a communication system 100 for localizing a mobile data path in a radio access network under control of a mobile packet core in a network environment. The particular embodiment illustrated in FIG. 1 is shown as including general packet radio service (GPRS) network elements. However, it should be understood that in other embodiments any other suitable network elements may be used. The communication system of FIG. 1 includes first user equipment (UE) 102a and second user equipment 102b. First user equipment 102a may connect wirelessly to a first base station 104a and second user equipment 102b may connect wirelessly to a second base station 104b. In one or more embodiments, first base station 104a and second base station 104b are mobile base stations of a radio access network (RAN). In a particular embodiment, first base station 104a and second base station 104b are each an Evolved Node B (eNodeB) Long Term Evolution (LTE) base station node. In still other embodiments, first base station 104a and second base station 104b are each a Universal Mobile Telecommunications System (UMTS) base station node. First base station 104a may be further connected to a first Serving GPRS support node (SGSN) and/or intermediate router 106a, and second base station 104b may be further connected to a second SGSN/intermediate router 106b. An SGSN, such as first SGSN/intermediate router 106a and second SGSN/intermediate router 106b may be responsible for the delivery of data packets from and to user equipment within its geographical service area. Its tasks may include packet routing and transfer, mobility management, logical link management, and authentication and charging functions.

Each of first SGSN/intermediate router 106a and second SGSN/intermediate router 106b may be further connected to a Gateway GPRS support node (GGSN)/packet gateway (PGW) 108 within a mobile core network. GGSN/PGW 108 may be further connected to one or more core network services 110 within the mobile core network. Core network services 110 may include authentication, authorization, and accounting (AAA) services, billing services, policy services, and other core network services. In the particular embodiment illustrated in FIG. 1, the core network services may include AAA services, an online charging system (OCS), a policy and charging rules function (PCRF), a home location register (HLR), and a home subscriber server. GGSN/PGW 108 may be further connected to the Internet 112, a mobile data center 114, and service provider services 116. In a particular embodiment, GGSN/PGW 108 is responsible for the internetworking between the GPRS network and external packet switched networks such as the Internet and X.25 networks. In particular embodiments, GGSN/PGW 108 is an anchor point that enables mobility of user equipment 102a-102b in GPRS/UMTS networks and maintains routing information necessary to tunnel protocol data units (PDUs) to the SGSN that services the particular user equipment 102a-102b, e.g. one or more mobile stations. GGSN/PGW 108 may encapsulate GPRS packets received from first SGSN/intermediate router 106a into an appropriate packet data protocol (PDP) format (e.g., IP or X.25) and send packets out on the corresponding packet data network. GGSN/PGW 108 may further store a current SGSN address associated with a user and his or her profile in a location register of GGSN/PGW 108. GGSN/PGW 108 may further be responsible for IP address assignment and is the default router for connected user equipment (UE) 102a-102b. GGSN/PGW 108 may further perform authentication, billing/charging functions and other functions via core network services 110. Communication system 100 may further include an IP backhaul from the RAN to GGSN/PGW 108.

First base station 104a includes a first core network client component 118a, and second base station 104b includes a second core network client component 118b. GGSN/PGW 108 includes a core network director component 120. In accordance with various embodiments, each of first core network client component 118a, second core network client component 118b, and core network director component 120 may include one or more software components, one or more hardware components, or a combination of software and hardware components. First core network client component 118a is in communication with core network director component 120 using a first control channel 122a established between first core network client component 118a and core network director component 120. Similarly, second core network client component 118b is in communication with core network director component 120 using a second control channel 122b established between second core network client component 118b and core network director component 120. In one or more embodiments, first control channel 122a and second control channel 122b are each an out-of-band channel established between the respective core network clients 118a-118b and core network director component 120. In still other embodiments, first control channel 122a and second control channel 122b are in-band channels. In accordance with various embodiments, core network director 120 is configured to send policy information regarding a subscriber to first core network client component 118a and second core network client component 118b over the first control channel 122a and the second control channel, respectively. First core network client component 118a and second core network client component 118b may then implement the one or more policies conveyed by the policy information within the RAN upon data associated with a subscriber as will be further described herein.

Each of the elements of FIG. 1 may couple to one another through simple interfaces (as illustrated), or through any other suitable connection (wired or wireless), which can provide a viable pathway for network communications. Additionally, any one or more of these elements may be combined or removed from the architecture based on particular configuration needs. Communication system 100 may facilitate transmission control protocol/Internet protocol (TCP/IP) communications for the transmission or reception of packets in a network, and may operate in conjunction with a user datagram protocol/IP (UDP/IP), or any other suitable protocol where appropriate and based on particular needs.

Communication system 100 may be tied to the 3rd Generation Partnership Project (3GPP) Evolved Packet System architecture, but alternatively this depicted architecture may be equally applicable to other environments such as a 4G LTE network. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks can be performed via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that first user equipment 102a and second user equipment 102b can be associated with clients, customers, or end users wishing to initiate a communication in system 100 via some network. In one particular example, first user equipment 102a and second user equipment 102b reflects devices configured to generate wireless network traffic. The term 'endpoint' and 'end-station' are included within the broad term user equipment, as used herein. First user equipment 102a and second user equipment 102b can include devices used to initiate a communication, such as a computer, a personal digital assistant (PDA), a laptop or electronic notebook, a cellular telephone, an iPhone, a Blackberry, an Android, a smartphone, a tablet, an iPad, an IP phone, or any other device, component, element, equipment, or object capable of initiating voice, audio, video, media, or data exchanges within communication system 100. First user equipment 102a and second user equipment 102b may also include a suitable interface to the human user, such as a microphone, a display, or a keyboard or other terminal equipment. First user equipment 102a and second user equipment 102b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

For purposes of illustrating certain example techniques of communication system 100, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets.

The term packet is used to refer to data plane packets, control plane packets, and management plane packets. In general, the data plane (also known as the forwarding plane, or the user plane) provides the ability to forward data packets; the control plane provides the ability to route data correctly; and the management plane provides the ability to manage network elements. For normal IP packet processing, an IP router typically has a data plane, a control plane, and a management plane. The IP packets themselves support all of the planes for any IP-based protocol, and the IP router has no inherent knowledge about whether each IP packet is a data, control, or management plane packet.

The vast majority of packets handled by a router travel through the router via the data plane. Data plane packets typically consist of end-station, user-generated packets, which are forwarded by network devices to other end-station devices. Data plane packets may have a transit destination IP address, and they can be handled by normal, destination IP address-based forwarding processes. Service plane packets can be a special type of data plane packets. Service plane packets are also user-generated packets, which may be forwarded by network elements to other end-station devices; however, they may require high-touch handling by a network element (above and beyond normal, destination IP address-based forwarding) to properly forward the packet.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on an IP router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station that are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

In existing systems, data packets arrive at the mobile gateway to get served and billed according to 3GPP specification. Some 3GPP solutions such as Selected IP Traffic Offload (SIPTO) allows for local traffic offload, but mobile packet core services such as billing are not available for the locally offloaded traffic. Other solution such as Local IP Access (LIPA) require distributing the gateway function which will disrupt the existing gateway and mobile packet core infrastructure and is thus not practical for operators.

In a 3GPP system, subscriber information is kept by the packet gateway and addressed by way of a mobile node's IP address at the (S)Gi side and GTP tunnel identifier at the 3GPP network side. For instance, in LTE, the P-GW hosts both a mobility anchor point and a service plane for mobile nodes. Similarly, in UMTS, the GGSN provides similar functionality. This subscriber information keeps and maintains charging and policy information, provides a point at which regulatory functions can execute (e.g. lawful intercept) and may provide additional subscriber-specific functions such as Policy Control and Charging (PCC), firewalls, video and HTTP proxies and network address and port translation (NAPT) functions.

Further, 3GPP manages itself by way of bearers or PDP-Contexts. A bearer is an end-to-end connection between a mobile node, (logical) radio channels, and per-bearer GTP tunnels between the RAN and the packet gateway. Moreover, in 3GPP, potentially a mobile node can maintain multiple bearers each pointing to different packet gateways.

When a packet arrives in the packet gateway from the Internet or another autonomous system destined to the mobile node, the packet gateway first selects the appropriate subscriber state. Based on this state, the packets are routed through the services associated with the mobile node before being routed over GTP tunnels to downstream 3GPP nodes by way of its GTP bearer. The appropriate GTP tunnel identifiers and GTP next hops are recorded in the subscriber's GTP bearer state. As seen from the packet gateways, downstream 3GPP nodes can be the LTE S-GW, UMTS SGSN or even the 3GPP RAN nodes (RNC in regular UMTS or NodeB base station for I-HSPA) in a case in which direct-tunnel is used. These intermediate nodes map incoming bearers on outgoing bearers by replacing both the GTP next hop and potentially the GTP tunnel identifier.

Packets originating from the mobile node are routed from the 3GPP RAN potentially through intermediate nodes to the packet gateway. Again, a GTP tunnel identifier and the GTP next hop routing are first used to route packets over the GTP bearer to intermediate 3GPP nodes before these parameters are used to select the appropriate subscriber state in the packet gateway. Note that depending on the configuration of the network, the roaming state of the mobile node and the state of the mobile node itself, there can be a direct tunnel between the packet gateway and RAN, or there can be two cascaded tunnels between the two elements.

Today user services are typically implemented in the packet core (LTE and UMTS) which is centralized and all user traffic is tunneled to that central location for services to be applied. Various embodiments provide an architecture that enables the deployment of services in-line with data flow inside a RAN such as, for example, at a base station, Enhanced NodeB, UMTS Radio Network Controller (RNC), or other suitable network element. In accordance with various embodiments, the architecture described herein allows selected services to be implemented in the base station or other RAN network element to improve user experience, make better use of locally relevant information and improve network efficiency. Examples of improved user experience that may be provided include locally hosted gaming applications with reduced latency and significantly improved response times, caching or optimization applications which reduce backhaul loading and help postpone capital investments.

Various embodiments provide for locally terminating a data path under the control of the mobile packet core by the use of a logical control channel between the control plane point of attachment at an entity in the mobile gateway and the point in the RAN in which the control and data traffic enter the mobile network. In accordance with one or more embodiments, the control channel has two endpoints: a first endpoint in the core network collocated with a session's point of attachment and the second one in the RAN also collocated with the RAN point of entry into the mobile network. The control channel carries policy information associated with one or more subscriber policies sent in the downlink direction from the core network. In particular embodiments, the core network is the originator of these policies which convey instructions regarding services and local data path handling. The RAN endpoint receives the policy information and enforces the policies accordingly to their content. In the uplink direction, the RAN endpoint sends reports to the core network to convey relevant information about the user session and bearers such as consumed volume. In various embodiments, the control channel, policies and reports are key to enabling localized data path handling in a selective fashion while still providing mobile packet core services such as billing and other services.

In a particular embodiment, a PDP/PDN Session is established and always anchored in the mobile packet core on GGSN/PGW 108, control traffic (Gx, Gy, Ga, L1) continues to be anchored on GGSN/PGW 108 as per 3GPP specifications, and the data plane can either remain centralized in the mobile packet core network for traffic requiring full service control or distributed to first core network client component 118*a* and/or second core network client component 118*b* in the RAN as per policies received from core network director component 120 for specific use cases. The control plane may be controlled from the mobile packet core network by core network director component 120 based on user services, traffic type, and other data. Core network director component 120 may further interacts with GGSN/PGW 108 to obtain user information.

Control Channel

In various embodiments a logical control channel, such as first control channel 122*a* and/or second control channel 112*b*, is established either in-band or out-of-band between the core network client in the RAN and the core network director in the mobile packet core. In a particular embodiment, both endpoints of the channel may be uniquely identified in the mobile core network topology. In particular embodiments, this unique identification may rely on an IP addresses or other identifier used in the mobile network. In various embodiments, the identification is applied to the endpoints themselves and is decoupled from the information carried within the channel and how it identifies an individual session. In one or more embodiments, the control channel is bidirectional such that the policy information may be sent from the core network director in the mobile packet core network to one or more core network clients in the RAN in the downlink direction. A core network client in the RAN may further send information related to the user session to the core network director in the mobile core network in the uplink direction. The information carried by the control channel may uniquely identify which end user session it is applicable to and the control channel may use an appropriate protocol to convey the bidirectional exchange of information effectively.

Data Path Policies

In one or more embodiments, a core network director in the mobile packet core network sends data path policy information associated with policies originating in the mobile packet core to a core network client in the RAN endpoint via the control channel. The data path policy information may identify a specific user session for which they are applicable. In one or more embodiments, the mobile core network endpoint is responsible for creating one or more data path policies based on a variety of inputs such as based on a particular user, a service profile, session information, dynamic bearers, applications used at any given point, dynamic network state and other factors. These data path policies may be constructed based on one or more of the conditions mentioned above which are provided only as examples and are not intended to be limiting. In other embodiments, other factors may be used to construct one or more data path policies.

The data path policies may include actions to be enforced by the RAN endpoint in which there is a common understanding and interpretation of these actions by the core network endpoint and RAN endpoint of the control channel. Examples of action that may be enforced by the RAN include local data path handling or reverting to standard 3GPP data path handing in the mobile packet core, local content delivery, local traffic optimization or local service application. Other types of actions may also be defined to handle local data path in the RAN. The data path policies are sent from the core network to the RAN endpoint and are intended to influence how the data path is handled for a particular condition. The data path policies may convey policies about localized data path handling or an enforcement action in which the localized data path handling is now handed over the core data path handling. It should be understood that the data path policies can be sent at any point during a user session and are not necessarily required to be set during the beginning of the user session.

Local Data Path Reports

Once a RAN endpoint receives polices from the mobile packet core to handle a data path locally, the RAN endpoint may enforce these policies. As part of enforcing these policies, the RAN endpoint may collect relevant information related to the localized data path handling. The relevant information may include traffic volume, time and event information that is relevant in creating billing records, as well as other information that the RAN endpoint may collect. Then Ran endpoint includes thus.

Data Path Policy Creation

In various embodiments, the mobile packet core network is responsible for creating the data path policies described above. In creating these policies, the mobile packet core network may take into consideration user identity, billing and service profile as it is defined in the context of the mobile operator and other static or dynamic information available at the beginning of the session. It can also take under consideration dynamic information that is available during the session. In one or more embodiments, the policies may be created by core network director 120. In still other embodiments, the policies may be created by another network element and provided to core network director 120.

Data Path Policy Enforcement

In accordance with various embodiments, a core network client in the RAN endpoint will interpret and enforce the data path polices it receives from the core network director in the mobile packet core network. The enforcement action may occur at the beginning of a session or while the session is in progress. In particular embodiments, data path policy enforcement may include localizing the data path and applying a selected set of services. In other embodiments, data path policy enforcement may include moving the handling of the data path to the mobile packet core network.

Hence, the architecture of FIG. 1 can effectively provide a mechanism in which a mobile packet core network entity, such as core network director component 120 of GGSN/PGW 108, can direct an entity in the RAN, such first core network client 118a, to handle a data path associated with a subscriber locally in the RAN/transport under a selected set of conditions defined by one or more policies via establishment of a control channel between the mobile packet core network entity and the RAN entity. This may be a dynamic decision based on a set of triggers and network information. The enforcement of the policies may also be dynamic and may occur at any time during a session. The control channel allows bringing the localized data path to the core if required by the dynamically changed network conditions. Handling the data path locally may include either providing local content, activating localized applications or providing local services on the transit data traffic. At the same time this mechanism may allow collecting of sufficient information from the locally terminated data path to apply mobile packet core services such as billing. In various embodiments the handling of a session control path which may remain terminated at the mobile gateway is not affected. One or more embodiments provide a selective application of policies based on, for example, a user services profile and billing status and other policies that can dynamically change. Hence the decision to handle the data path locally may be made dynamically based on up-to-date subscriber information. Further, it may allow the RAN/transport to be aware of the user identity and tailor the data path handling accordingly.

Figure 2:
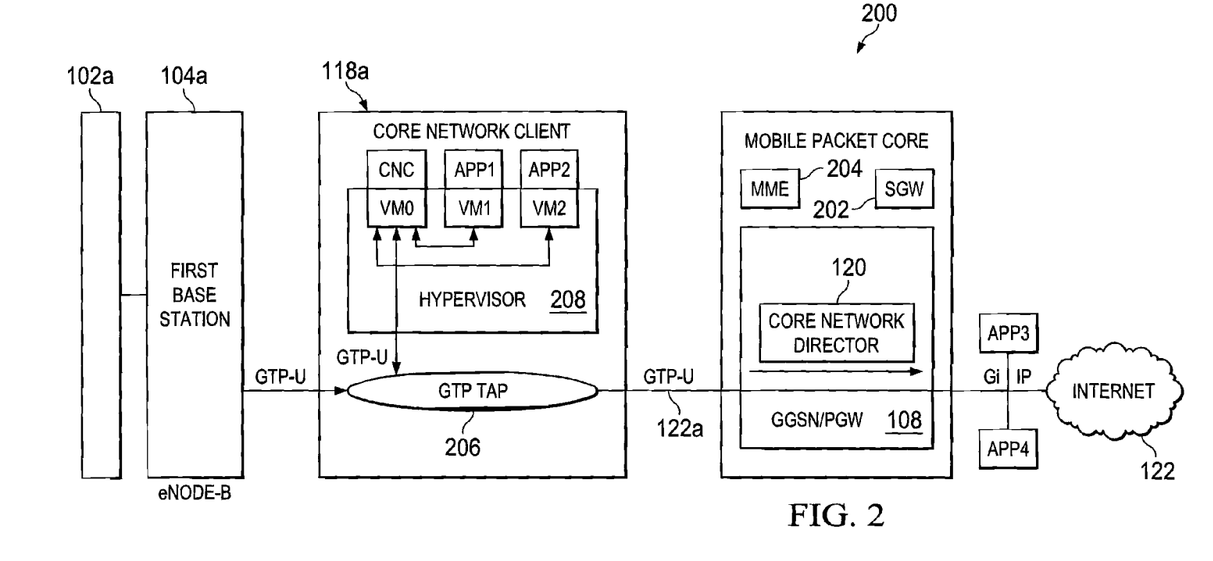
FIG. 2 is a simplified block diagram illustrating a possible example architecture associated with the communication system in accordance with one embodiment of the present disclosure.

FIG. 2 is a simplified block diagram 200 illustrating a possible example architecture associated with communication system 100 in accordance with one embodiment of the present disclosure. FIG. 2 includes first user equipment 102a in communication with first base station 104a. In the particular embodiment of FIG. 2, first base station 104a is an eNodeB of a UMTS system. First base station 104a is in further communication with first core network client component 118a via a GTP-U tunneling protocol. GTP-U is used for carrying user data within a GPRS core network and between a radio access network and the core network. First core network client component 118a is in further communication with core network director 120 residing within GGSN/PGW 108 of the mobile packet core via first control channel 122a. In one embodiment, the first control channel 122a is an out-of-band communication channel established between first core network client component 118a and core network director 120. In another particular embodiment, first control channel 122a is an in-band communication channel established through a GTP-U tunnel established between first core network client component 118a and core network director 120. GGSN/PGW 108 is in further communication with the Internet 122 via a Gi interface using an IP protocol. The Gi interface is an IP based GPRS interface between GGSN/PW 108 and a public data network (PDN) either directly to the Internet 122 or through a Wireless Application Protocol (WAP) gateway. The mobile packet core network may further include a serving gateway (SGW) 202 and a Mobility Management Entity (MME) 204.

The first core network client component 118a include a GPRS tunneling protocol (GTP) tap 206, and a hypervisor 208. GTP tap 206 is configured to receive GTP encapsulated packets from one or more of first base station 104a, hypervisor 208, and core network director 120. GTP tap 206 is further configured to determine a destination for the GTP encapsulated packets and forward the GTP encapsulated packets and forward the GTP encapsulated packets to the destination including one or more of first base station 104a, hypervisor 208, and core network director 120. Hypervisor 208 is a virtual machine monitor (VMM) which is a piece of software, firmware and/or hardware that creates and runs virtual machines. A virtual machine (VM) is a software implementation of a machine (i.e. a computer) that executes programs as if it is a physical machine. A computer on which a hypervisor is running one or more virtual machines is defined as a host machine. Each virtual machine is called a guest machine. The hypervisor may presents guest operating systems with a virtual operating platform and manage the execution of the guest operating systems. Multiple instances of a variety of operating systems may share the virtualized hardware resources.

In the particular embodiment illustrated in FIG. 2, hypervisor 208 includes a number of virtual machines VM0, VM1, and VM2. Virtual machine VM0 is configured to execute a core network client application (CNC) to perform the functions and capabilities of the core network client as described herein. Virtual machine VM1 is configured to execute a first local application (APP1) and virtual machine VM2 is configured to implement a second local application (APP2). APP1 and APP2 are each configured to perform in-line processing upon user data associated with first user equipment 102a to implement one or more polices and/or services indicated by policy information received from core network director 120 via first control channel 122a. Examples of processing that may be performed by APP1 and/or APP2 include Transmission Control Protocol (TCP) optimization and web caching.

A third application (APP3) and a fourth application (APP4) may further be in communication with the IP network to provide services and/or policy implementations from the Internet 122 or another public network to data associated with user equipment 102a as a companion application with first local application (APP1) and second local application (APP2) such as for a web caching function. Alternately, third application (APP3) and fourth application (APP4) may provide services and/or policy implementations separately from the services or policies performed by first local application (APP1) and second local application (APP2).

In an example operation, GTP encapsulated traffic associated with a subscriber, such as a subscriber associated with first user equipment 102a, is received from GGSN/PGW 108 over a GTP tunnel by GTP tap 206. GTP tap 206 forwards the packets to virtual machine VM0 which hosts the core network client (CNC). The core network client (CNC) then looks at internal tables which associate subscribers to one or more policies to determine if for that particular subscriber, packets need to be subjected to one or more applications such as APP1 or APP2. If so, the core network client forwards the packets to one or more of applications APP1 and APP2. After processing by one or more of APP1 and APP2, the packets are re-injected by GTP tap 206 and are forwarded toward first base station 104a (e.g., an eNode-B). Although first base station 104 and core network client component 118a are illustrated as separate instances in FIG. 2, it should be understood that in one or more embodiments first base station 104a and core network client component 118a may be integrated as a single instance such that the processing of core network client component 118a resides within first base station 104a.

Although the particular embodiment illustrated in FIG. 2 is shown as using hypervisor 208, it should be understood that in other embodiments a multi-tasking operating system may be used with each application executed as one or more processes on one or more processors of a computer or other computing device.

Figure 3:
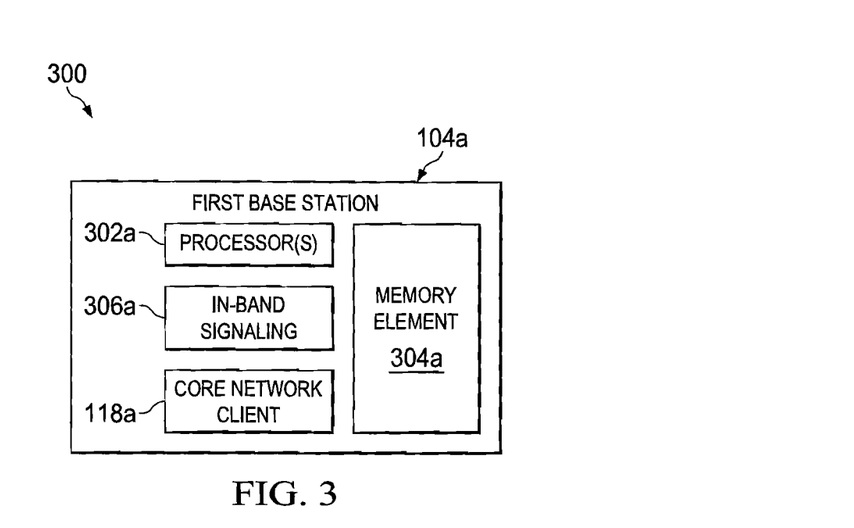
FIG. 3 is a simplified block diagram illustrating a particular embodiment of the first base station of the communication system of FIG. 1.

FIG. 3 is a simplified block diagram 300 illustrating a particular embodiment of first base station 104a of communication system 100 of FIG. 1. First base station 104a includes one or more processor(s) 302a, a memory element 304a, an in-band signaling component 306a, and core network client 118a. Processor(s) 302a are configured to execute software instructions to perform various operations of base station 104a as described herein. Memory element 304a may be configured to store software instructions and data associated with base station 104a. In-band signaling component 306a is configured to establish an in-band control channel, such as first control channel 122a, with core network director component 120 of GGSN/PGW 108. In a particular embodiment, the in-band control channel is a GTP-U channel. Core network client component 118a is configured to implement the various core network client operations as described herein. In one or more embodiments, second base station 104b may be implemented in a similar manner as first base station 104a.

Although the particular embodiment illustrated in FIG. 3 shows base station 104a as including a single node, it should be understood that in other embodiments base station 104a may include any number of nodes. In still other embodiments, a cluster may be formed of any number of processing nodes distributed throughout a number of servers or other network elements within a communication network.

Figure 4:
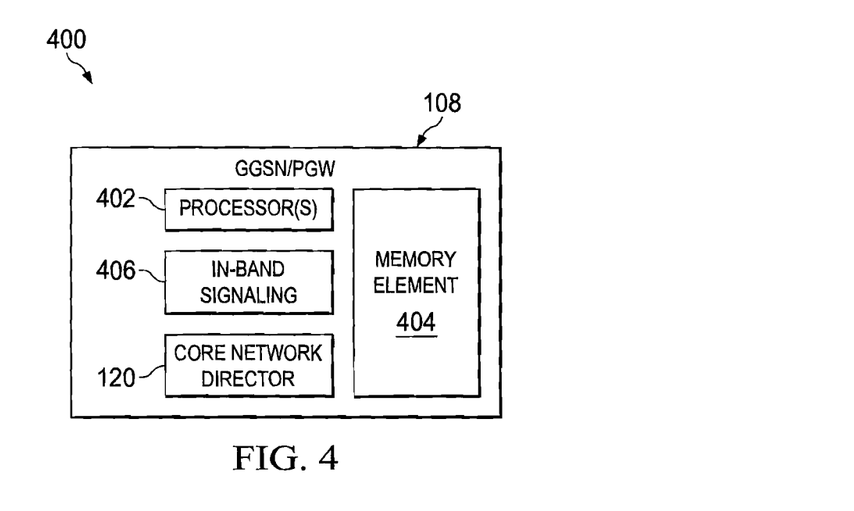
FIG. 4 is a simplified block diagram illustrating a particular embodiment of the Gateway GPRS support node/packet gateway (GGSN/PGW) of the communication system of FIG. 1.

FIG. 4 is a simplified block diagram 400 illustrating a particular embodiment of GGSN/PGW 108 of communication system 100 of FIG. 1. GGSN/PGW 108 includes one or more processor(s) 402, a memory element 404, in-band signaling component 406, and core network director component 120. Processor(s) 402 are configured to execute software instructions to perform various operations of GGSN/PGW 108 as described herein. Memory element 404 may be configured to store software instructions and data associated with GGSN/PGW 108. In-band signaling component 406 is configured to establish an in-band control channel, such as first control channel 122a, with core network client 118a of base station 104a. In a particular embodiment, the in-band control channel is a GTP-U channel. Core network director component 118a is configured to implement the various core network director operations as described herein.

Although the particular embodiment illustrated in FIG. 4 shows GGSN/PGW 108 as including a single node, it should be understood that in other embodiments GGSN/PGW 108 may include any number of nodes. In still other embodiments, a cluster may be formed of any number of processing nodes distributed throughout a number of servers or other network elements within a communication network.

Dynamic Establishment and Maintenance of Control Channel

Referring again to FIG. 1, an embodiment of a procedure for dynamically establishing and maintaining a control channel connection between core network client component 118a and core network director 120 is described. Various embodiments of communication system 100 enables the hosting of services in a radio access network, such as 3GPP Radio Access Network (RAN). In one or more embodiments, the services are hosted in one or more of first base station 104a and second base station 104b such that these services may, for example, be locally relevant, reduce end-to-end delay, and reduce backhaul resources or other resources, while not compromising existing and centralized charging, lawful intercept and other traditional functions hosted in existing mobile packet core networks. In order to achieve this in various embodiments, the core network client is hosted in the RAN and the core network director is hosted on the packet gateway.

Figure 5:
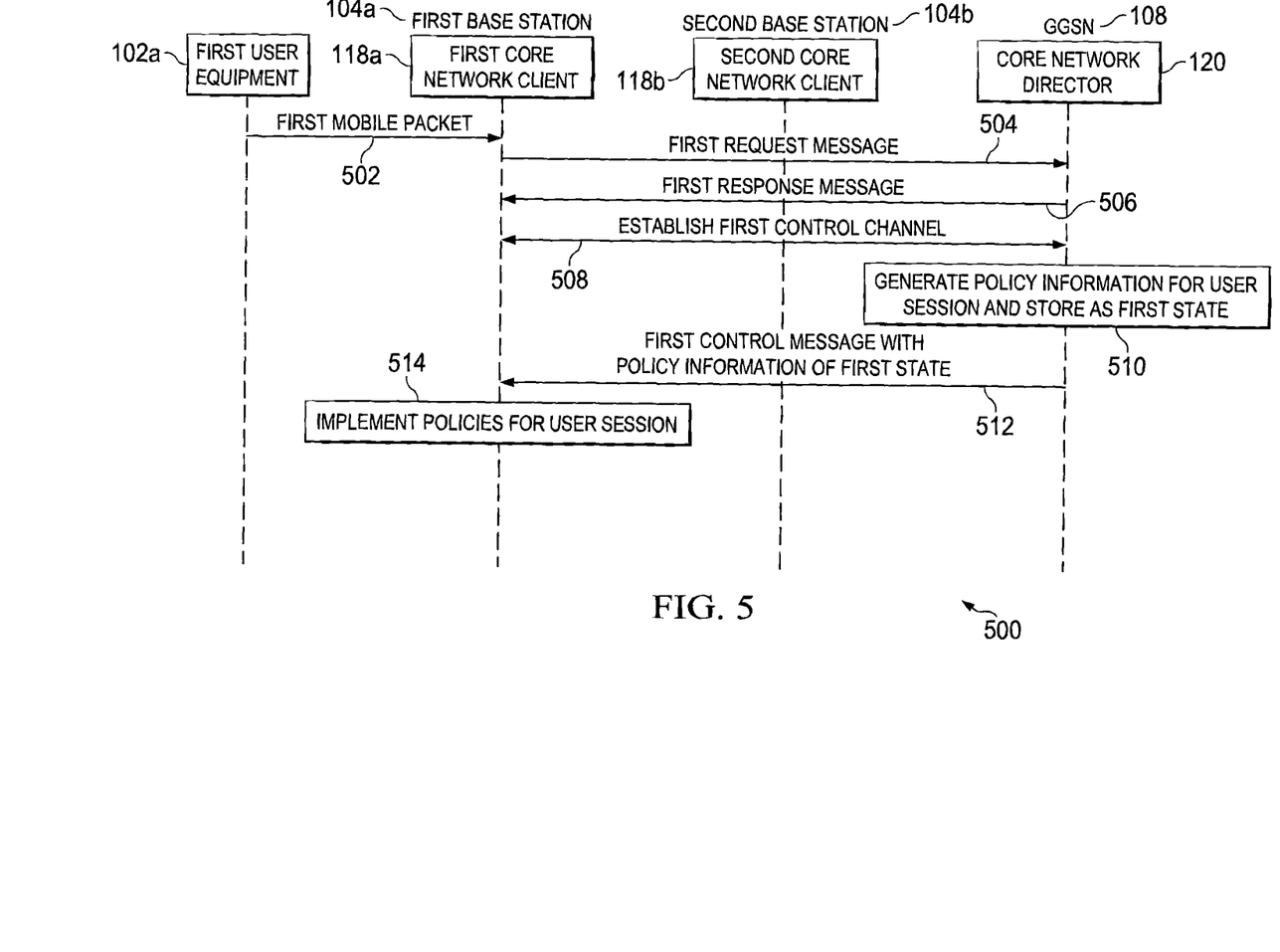
FIG. 5 is a simplified flow diagram illustrating potential operations of the communication system associated with one embodiment of the present disclosure.

Referring now to FIG. 5, FIG. 5 is a simplified flow diagram 500 illustrating potential operations of communication system 100 associated with one embodiment of the present disclosure. In particular, simplified flow diagram 500 illustrates operations for establishment and maintenance of a control channel showing flows and operations associated with first user equipment 102a, first core network client 118a of first base station 104a, second core network client 118b of second base station 104b, and core network director 120 of GGSN/PGW 108. In 502, first core network client 118a within first base station 104a receives a first mobile packet from user equipment 102a. In one or more embodiments, the first mobile packet is associated with a user session of a subscriber or user of first user equipment 102a. In 504, first core network client 118a generates and sends a first request message including a session identifier associated with the user session and sends the first request message including the session identifier to core network director 120 of GGSN/PGW 108. In a particular embodiment, the first request message is sent to core network director 120 through a GTP-U tunnel between first core network client 118a and core network director 120. Although not illustrated in FIG. 5, it should be understood that in one or more embodiments first base station 104a may communicate with GGSN/PGW 108 via first SGSN/intermediate router 106a, and second base station 104b may communication with GGSN/PGW 108 via second SGSN/intermediate router 106b. In 506, core network director 120 generates a first response message and sends the first response message to first core network client 118a. In one or more embodiments, the first response message includes subscriber information and connection information associated with the user session. In 508, a first control channel is established between first core network client 118a and core network director 120 for the user session. In one embodiment, the first control channel is an in-band channel established between first core network client 118a and core network director 120. In still another embodiment, the first control channel may be an out-of-band channel established between first core network client 118a and core network director 120.

In 510, core network director 120 generates policy information for the user session and stores the policy information as a first state of first core network client 118a for the user session. The policy information is indicative of one or more policies to be applied in the access network to user data associated with the user session. The policies may include one or more applications, services, or processing actions to be applied to user data associated with the user session. In 512, core network director 120 sends the first control messages with the policy information of the first state to first core network client 118a using the first control channel. In 514, first core network client 118a implements one or more policies identified and/or indicated by the policy information to the user session such that user data associated with the user session is processed according to the one or more policies. For example, implementing one or more policies may include executing an application within the RAN to process the user data in accordance with the one or more policies. The operations then end.

Figure 6:
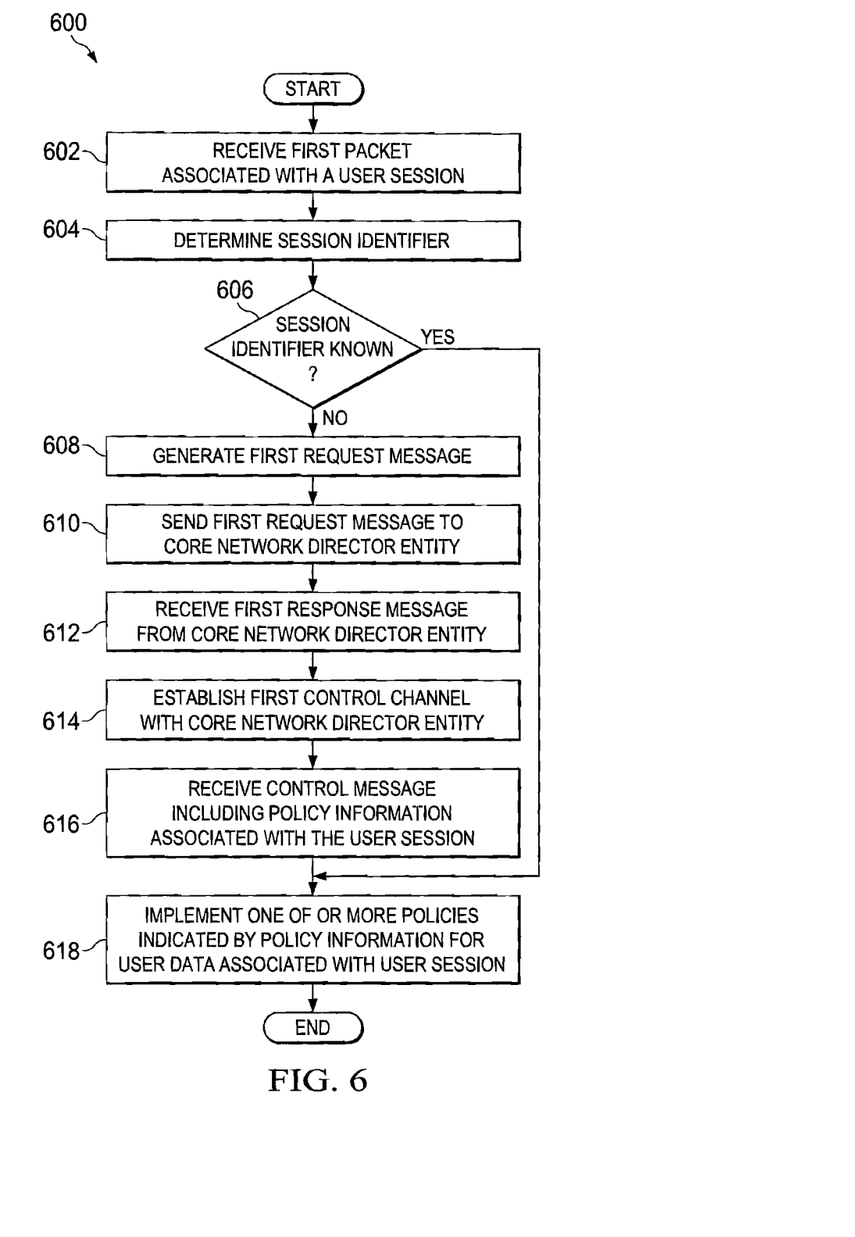
FIG. 6 is a simplified flow diagram illustrating potential operations associated with a core network client entity according to one embodiment of the present disclosure.

Referring now to FIG. 6, FIG. 6 is a simplified flow diagram 600 illustrating potential operations associated with a core network client entity according to one embodiment of the present disclosure. The core network client entity resides within or is associated with an access network such as a radio access network. In a particular embodiment, the core network client entity includes first core network client component 118a. In 602, the core network client entity receives a first packet associated with a user session. In a particular embodiment, the first packet is a mobile packet received from first user equipment 102a. In 604, the core network client entity determines a session identifier associated with the user session. In 606, the core network client entity determines whether the session identifier is known to the core network client entity. In one or more embodiments, the core network client entity determines whether the core session identifier is found in a table or list maintained by the core network client entity indicative of the core network client entity previously receiving the session identifier. If the core network client entity determines that the session identifier is not known to the core network client entity, the flow continues to 608. In 608, the core network client entity generates a first request message including the session identifier. In 610, the core network client entity sends the first request message to a core network director entity residing within or associated with a core network. In a particular embodiment, the core network director entity includes core network director component 120. Upon receiving the first request message, the core network director entity will generate and send a first response message to the core network client entity. In 612, the core network client entity receives the first response message from the core network director entity. In 614, the core network client entity establishes a first control channel with the core network director entity. In at least one embodiment, the first control channel is associated with the session identifier. The first control channel is associated with the user session. In at least one embodiment, the first control channel is an in-band channel established between the core network client entity and the core network director entity.

The core network director entity will generate policy information for the user session and send a control message including the policy information to the core network client entity using the first control channel. In 616, the core network client entity receives a first control message including the policy information using the first control channel. In 618, the core network client entity implements one or more policies indicated by the policy information for user data associated with the user session. If in 606 the core network client entity determines that the session identifier is known to the core network client entity, the operations continue to 618 as described above. In a particular embodiment, the session identifier being known to the core network client entity is indicative of the session identifier being previously received by the core network client entity. The operations then end.

Figure 7:
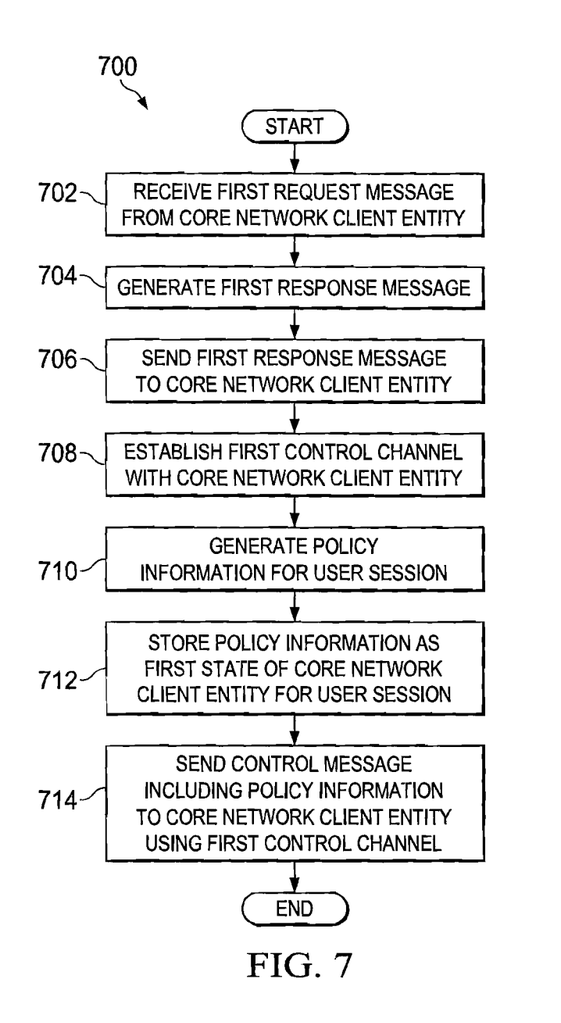
FIG. 7 is a simplified flow diagram illustrating potential operations associated with a core network director entity according to one embodiment of the present disclosure.

Referring now to FIG. 7, FIG. 7 is a simplified flow diagram 700 illustrating potential operations associated with a core network director entity according to one embodiment of the present disclosure. In a particular embodiment, the core network director entity includes core network director component 120. In 702, the core network director entity receives a first request message from a core network client entity. In a particular embodiment, the core network client entity includes first core network client component 118a. The first request message includes a session identifier associated with a user session. In a particular embodiment, the user session is associated with user equipment. In 704, the core network director entity generates a first response message. In one or more embodiments, the first response message includes subscriber information and connection information associated with the user session. In 706, the core network director entity sends the first response message to the core network client entity. In 708, the core network director entity establishes a first control channel with the core network client entity. In one embodiment, the first control channel is an in-band channel established between the core network client entity and the core network director entity. In still another embodiment, the first control channel may be an out-of-band channel established between the first core network client entity and the core network director entity.

In 710, the core network director entity generates policy information for the user session. In 712, the core network director entity stores the policy information as a first state of the core network client entity for the user session. The policy information indicates one or more policies to be applied to user data associated with the user session by the core network client entity. The policies may include one or more applications, services, or processing actions to be applied to user data associated with the user session. In 714, the core network director entity sends the first control messages with the policy information of the first state to the core network client entity using the first control channel. In response to receiving the policy information, the core network client entity may implement one or more policies identified and/or indicated by the policy information to the user session such that user data associated with the user session is processed according to the one or more policies. For example, implementing one or more policies may include executing an application within the RAN to process the user data. The operations then end.

Note that in certain example implementations, the data communication and routing functions outlined herein may be implemented by logic encoded in one or more tangible media (e.g., embedded logic provided in an application specific integrated circuit [ASIC], network processors, digital signal processor [DSP] instructions, software [potentially inclusive of object code and source code] to be executed by a processor, or other similar machine, etc.). In some of these instances, a memory element (as shown in FIG. 3 and FIG. 4) can store data used for the operations described herein. This includes the memory element being able to store software, logic, code, or processor instructions that are executed to carry out the activities described in this Specification.

A processor can execute any type of instructions associated with the data to achieve the operations detailed herein in this Specification. In one example, the processor (as shown in FIG. 3 and FIG. 4) could transform an element or an article (e.g., data) from one state or thing to another state or thing. In another example, the data communication and routing activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, base stations 104a-104b and GGSN/PGW 108 may include software in order to achieve the data communication functions outlined herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, queues, caches, etc.) should be construed as being encompassed within the broad term 'memory element.' Similarly, any of the potential processing elements, modules, and machines described in this Specification should be construed as being encompassed within the broad term 'processor.' Each of these elements can also include suitable interfaces for receiving, transmitting, and/or otherwise communicating data or information in a network environment.

Base stations 104a-104b and GGSN/PGW 108 are network elements configured to perform the activities disclosed herein. As used herein in this Specification, the term 'network element' may include any suitable hardware, software, components, modules, interfaces, or objects operable to exchange information in a network environment. Further, the term network element as discussed herein encompasses (but is not limited to) devices such as routers, switches, gateways, bridges, loadbalancers, firewalls, inline service nodes, proxies, clients, servers processors, modules, or any other suitable device, component, element, proprietary device, network appliance, or object operable to exchange information in a network environment. This may be inclusive of appropriate algorithms and communication protocols that allow for the effective exchange of data or information.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible scenarios and patterns that may be executed by, or within, communication system 100. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in different types of network applications. The architecture of the present disclosure can readily be used such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
establishing a control channel between a first entity residing within an access network and a second entity residing within a core network, the control channel associated with a session identifier identifying a user session;
receiving policy information associated with the user session from the second entity using the first control channel, the policy information indicative of one or more policies to be applied in the access network to user data associated with the user session; and
implementing the one or more policies indicated by the policy information for the user data associated with the user session within the access network.

2. The method of claim 1, wherein the one or more policies are implemented within the access network by the first entity.

3. The method of claim 1, wherein implementing the one or more policies includes executing an application within the access network to process the user data in accordance with the one or more policies.

4. The method of claim 1, further comprising determining, by the first entity, whether the session identifier is found in a list maintained by the first entity.

5. The method of claim 4, further comprising:
responsive to a determination that the session identifier is not found in the list maintained by the first entity:
sending, by the first entity, a request message including the session identifier associated with the user session to the second entity; and
receiving, by the first entity, a response message including subscriber information associated with the user session from the second entity.

6. The method of claim 1, wherein the control channel uses a tunneling protocol between the first entity and the second entity.

7. The method of claim 1, wherein the control channel is an out-of-band channel between the first entity and the second entity.

8. The method of claim 1, wherein the first entity is a client entity and the second entity is a director entity.

9. The method of claim 1, wherein the user session is associated with a user equipment.

10. The method of claim 1, wherein the first entity resides within a base station.

11. The method of claim 1, wherein the second entity resides within a packet gateway.

12. One or more non-transitory tangible media that includes code for execution and when executed by a processor operable to perform operations comprising:
- establishing a control channel between a first entity residing within an access network and a second entity residing within a core network, the control channel associated with a session identifier identifying a user session;
- receiving policy information associated with the user session from the second entity using the first control channel, the policy information indicative of one or more policies to be applied in the access network to user data associated with the user session; and
- implementing the one or more policies indicated by the policy information for the user data associated with the user session within the access network.

13. The media of claim 12, wherein the one or more policies are implemented within the access network by the first entity.

14. The media of claim 12, wherein implementing the one or more policies includes executing an application within the access network to process the user data in accordance with the one or more policies.

15. The media of claim 12, wherein the operations further include determining, by the first entity, whether the session identifier is found in a list maintained by the first entity.

16. The media of claim 15, wherein the operations further include:
- responsive to a determination that the session identifier is not found in the list maintained by the first entity:
  - sending, by the first entity, a request message including the session identifier associated with the user session to the second entity; and
  - receiving, by the first entity, a response message including subscriber information associated with the user session from the second entity.

17. The media of claim 12, wherein the control channel uses a tunneling protocol between the first entity and the second entity.

18. The media of claim 12, wherein the control channel is an out-of-band channel between the first entity and the second entity.

19. The media of claim 12, wherein the first entity is a client entity and the second entity is a director entity.

20. The media of claim 12, wherein the user session is associated with a user equipment.

21. The media of claim 12, wherein the first entity resides within a base station.

22. The media of claim 12, wherein the second entity resides within a packet gateway.

23. An apparatus, comprising:
- a memory element configured to store data,
- a processor operable to execute instructions associated with the data, and
- at least one module being configured to:
  - establish a control channel between a first entity residing within an access network and a second entity residing within a core network, the control channel associated with a session identifier identifying a user session;
  - receive policy information associated with the user session from the second entity using the first control channel, the policy information indicative of one or more policies to be applied in the access network to user data associated with the user session; and
  - implement the one or more policies indicated by the policy information for the user data associated with the user session within the access network.

24. The apparatus of claim 23, wherein the one or more policies are implemented within the access network by the first entity.

25. The apparatus of claim 23, wherein the at least one module is further configured to determine whether the session identifier is found in a list maintained by the first entity.

26. The apparatus of claim 25, further comprising:
- responsive to a determination that the session identifier is not found in the list maintained by the first entity, the at least one module is further configured to:
  - sending, by the first entity, a request message including the session identifier associated with the user session to the second entity; and
  - receiving, by the first entity, a response message including subscriber information associated with the user session from the second entity.

27. The apparatus of claim 23, wherein the control channel uses a tunneling protocol between the first entity and the second entity.

28. The apparatus of claim 23, wherein the control channel is an out-of-band channel between the first entity and the second entity.

29. The apparatus of claim 23, wherein the first entity resides within a base station.

30. The apparatus of claim 23, wherein the second entity resides within a packet gateway.

* * * * *